INVENTORS
Harald H. Lorenz. &
Roy S. Cataldo
BY John P. Moran
ATTORNEY

United States Patent Office 3,605,520
Patented Sept. 20, 1971

3,605,520
CABLE TRANSMISSION CONTROL
Harald H. Lorenz, Bloomfield Hills, and Roy S. Cataldo, Birmingham, Mich., assignors to General Motors Corporation, Detroit, Mich.
Filed Feb. 9, 1970, Ser. No. 9,861
Int. Cl. F16c 1/22
U.S. Cl. 74—501.5R    13 Claims

ABSTRACT OF THE DISCLOSURE

A shift control system having a first pulley operative in response to movement of a shift-selector mechanism, a second pulley operatively connected to an automatic transmission, a first cable portion connected to the first pulley, a second cable portion connected to the second pulley, and a centrally located spring-loaded cable-connector device, the latter including a bracket and a pair of fasteners for connecting each pair of opposing ends of the two cable portions at final assembly, and resilient means for maintaining the connected cable portions taut and for automatically compensating for any subsequent cable stretch and maintaining initial preload. The system may also include a ratchet arrangement for preventing collapse of the resilient means should the operational load exceed the installed resilient means load, thereby preventing a possibility of the operator experiencing a "spongy" pedal reaction.

---

This invention relates to control mechanisms and more particularly to a cable and pulley shift control mechanism for automatic transmissions.

This shift control system may be used with either a steering column-mounted or instrument panel-mounted selector mechanism. It embodies a first pulley to be actuated by the particular selector mechanism involved, a second pulley which responds thereto to operate the shift control rod of the transmission, and an intermediate continuous cable and cable-connector device, the overall arrangement eliminating the need for close manufacturing tolerances, facilitating quick and accurate final assembly, and resulting in low-friction operation with continually automatic adjustment for cable stretch.

Accordingly, an object of the invention is to provide an improved shift control mechanism wherein a portion thereof is mounted on or adjacent a steering column or instrument panel and another portion thereof is mounted on or adjacent an automatic transmission, with intermediate connector means for readily connecting the two portions at final assembly.

Another object of the invention is to provide a continuous cable-type shift control mechanism which is automatically self-adjusting in the event of cable stretch.

A further object of the invention is to provide an economical and highly efficient shift control mechanism.

These and other objects and advantages of the invention will become apparent when reference is made to the following specification and accompanying drawings, wherein.

Figure 1:
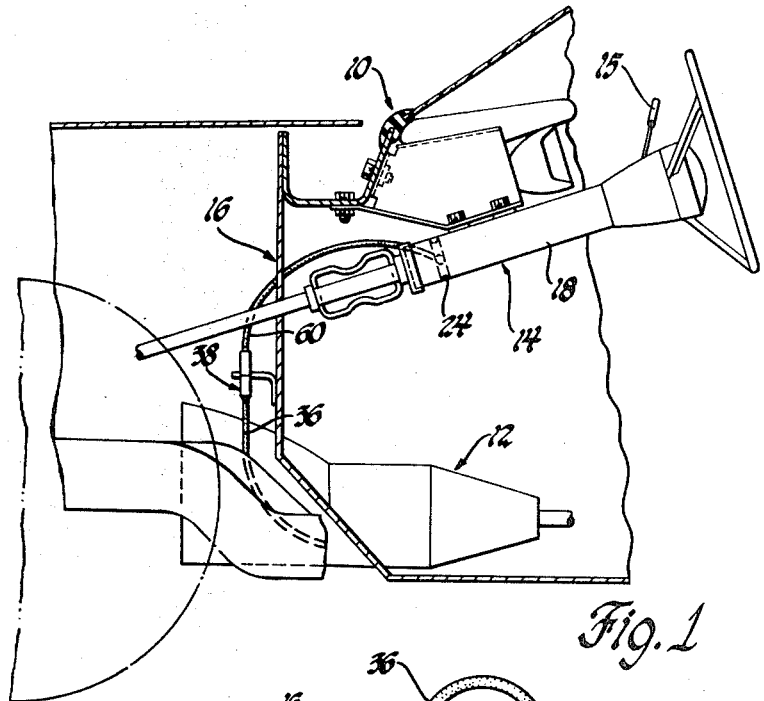
FIG. 1 is a fragmentary side view of a motor vehicle embodying the invention.

Referring now to the drawings in greater detail, FIG. 1 illustrates a motor vehicle 10 including an automatic transmission 12 and a steering column assembly 14 having a selector mechanism 15. A cable control mechanism 16 serves to operatively connect the mast jacket 18 of the steering column 14 to the automatic transmission 12 for selection of the desired shift ratio setting.

Figure 2:
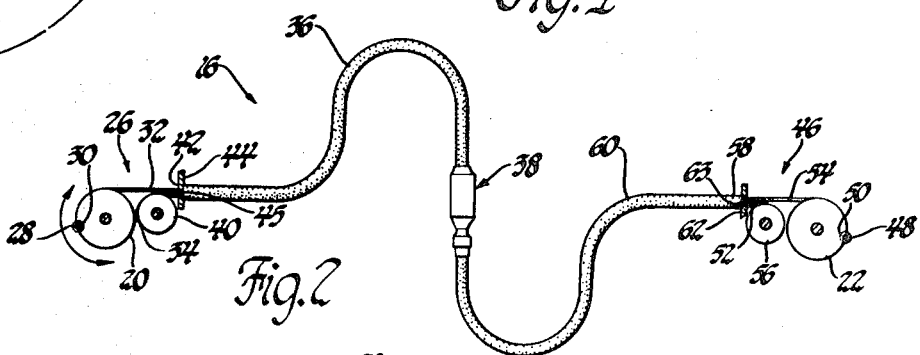
FIG. 2 is an enlarged plan view of a portion of FIG. 1.

The cable control mechanism 16 is better illustrated in FIG. 2, wherein it is seen to include a pulley 20 which is operatively connected by means of any suitable bell crank arrangement or other suitable arrangement to the usual shift control rod (not shown) of the automatic transmission 12, and a second pulley 22 which is operatively connected to the mast jacket 18. The pulley 22 may be formed as a part of the lower portion of the mast jacket 18, as at 24, with both members having identical axes. If an instrument panel-mounted selector mechanism is used, the pulley 22 may be rotatably connected thereto by means of lever or control knob mechanism (not shown).

A wire cable 26 is mounted around the transmission-related pulley 20 and is secured thereto by any suitable means, such as by being fixed at an intermediate point on an indexing ball 28, with the indexing ball being swaged in a groove or slot 30 formed on the outer periphery of the pulley 20. The length of the cable 26 is such that the two extensions 32 and 34 thereof, leading from the indexing ball 28, extend into and through a flexible conduit 36, and thence into a cable-connecting mechanism or splicing unit 38 for a purpose to be described. The flexible conduit 36 may be oval-shaped to better suit the two side-by-side cable extensions 32 and 34. The extension 34, as it leaves the pulley 20, is mounted around an idler pulley 40 in order to be aligned in a parallel relationship with the other extension 32 prior to entry of the extensions 32 and 34 into an inlet end 42 of the flexible conduit 36. The inlet end 42 is abutted against a fixed abutment or conduit anchor 44, the extensions 32 and 34 extending through an opening 45 formed in the anchor 44, and thence through the conduit 36.

A second wire cable 46 is mounted around the instrument panel- or steering column-related pulley 22 and secured thereto in the same manner as described above relative to the cable 26, i.e., by means of an indexing ball 48 which is swaged in a slot 50 formed on the pulley 22. One extension 52 of the two extensions 52 and 54 of the wire cable 46 is mounted around a portion of a second idler pulley 56 just prior to the entry of the cable extensions 52 and 54 into an inlet end 58 of a second flexible conduit 60, which, like the conduit 36, may be oval-shaped to better suit the cable extensions 52 and 54. The flexible conduit 60 is abutted at the inlet end 58 to a second fixed abutment or conduit or conduit anchor 62, the extenions 52 and 54 extending through an opening 63 formed in the anchor 62. The extensions 52 and 54 of the wire cable 46 then extend through the flexible conduit 60 into the splicing unit 38.

Figure 3:
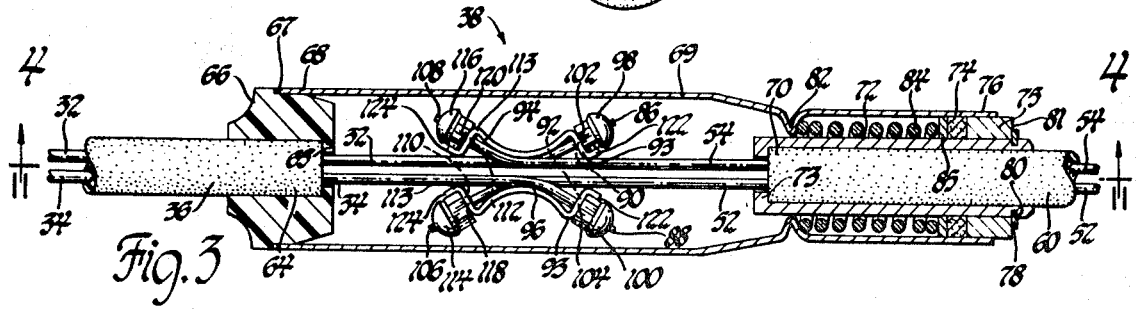
FIG. 3 is an enlarged cross-sectional view of a portion of FIG. 2.
Figure 4:
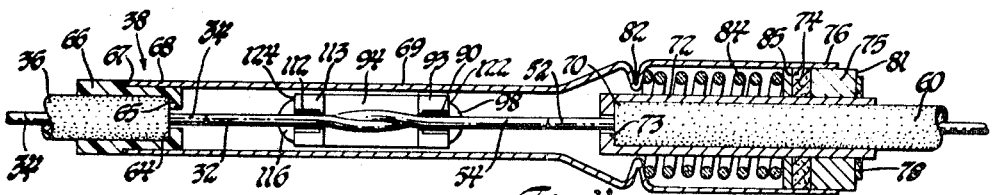
FIG. 4 is a cross-sectional view taken along the plane of line 4—4 of FIG. 3, as if FIG. 3 were a full round view.

Referring now to FIGS. 3 and 4, it may be noted that the outlet end 64 of the flexible conduit 36 is slidably mounted in a tubular sleeve or connector member 66, against an internal flange 65 formed thereon. The member 66 further includes an abutment 67 formed around the outer periphery thereof for abutment thereagainst by the outer tubular casing 69 of the splicing unit 38. The outlet end 70 of the other flexible conduit 60 is slidably mounted in a sleeve 72 against an internal flange 73 formed thereon. The sleeve 72 is confined at the outer end thereof within a seal 74 and a cylindrical member 75 adjacent the other end 76 of the splicing unit 38. The sleeve 72, as well as the connector member 66, is shaped to fit the outer surfaces of the respective conduits 60 and 36, which, as indicated above, may be oval-shaped around the respective pairs of cable extensions.

A retaining ring 78 is mounted in a groove 80 formed on the outside surface of the sleeve 72 adjacent the outer face 81 of the cylindrical member 75. A crimped portion 82 of the splicing unit 38 serves as an abutment for one end of resilient means, such as a coil spring 84, which is mounted around the sleeve 72 and compressed between an inner face of the crimped portion 82 and a washer 85 adjacent the innermost face of the seal 74. The innermost edge of the crimped portion 82 may, if desired, be shaped substantially the same as the outer surface of the sleeve 72 to better maintain the sleeve 72 aligned therein.

The free ends 86 and 88 of the cable extensions 32 and 34, respectively, are extended through slots 90 and 92 formed in the bent ends 93 of two generally arcuate-shaped brackets 94 and 96, respectively. Each of the free ends 86 and 88 extending through the respective slots 90 and 92 is secured therein by button-like nuts or fasteners 98 and 100 fixed on the cable extensions 32 and 34, the button-like fasteners abutting against the flat end surface portions 102 and 104 formed by the ends 93 of the brackets 94 and 96, respectively.

Similarly, it may be noted in FIG. 3 that the free ends 106 and 108 of the cable extensions 52 and 54 are secured through respective slots 110 and 112 formed in oppositely disposed bent ends 113 of the brackets 96 and 94, respectively, by similar button-like fasteners 114 and 116 fixed on the cable extensions 52 and 54 adjacent the flat end surfaces 118 and 120. Upturned edges 122 and 124 adjacent the flat surfaces 102, 104, 118 and 120 serve to retain the fasteners 98, 100, 114 and 116 in their respective positions such that the cable extensions 32, 34, 52 and 54 are turned outwardly from the axis of the casing 69 to abut against the innermost edge of the respective slots 90, 92, 110 and 112. The angles formed by the flat surfaces 102, 104, 118 and 120 with the axis of the tubular casing 69 are such that the upturned edges 122 and 124 are as close to the adjacent cable extensions as possible without interfering with same.

It may be noted in FIGS. 3 and 4 that the shape of the tubular casing 69 may be substantially rectangular in cross section so as to be narrow in the direction across the width of the brackets 94 and 96 (FIG. 4) and wider across the total height of the oppositely disposed brackets 94 and 96 and their associated fasteners 98, 100, 114 and 116, allowing minimal clearance for the reciprocal movement of the bracket and fastener assemblies.

Insofar as final assembly is concerned, the pulleys 20 and 40 would have been mounted on the vehicle 10 so as to actuate the shift control rod of the automatic transmission 12, with the cable extensions 32 and 34 extended through the opening 45 in the fixed conduit anchor 44. The pulleys 22 and 56 would have been received for final assembly mounted on the vehicle 10 so as to be actuated by the shift selector mechanism, such as being formed on the mast jacket 18, as illustrated in FIG. 1, along with the cable extensions 52 and 54 being extended through the openings 63 in the fixed conduit anchor 62. At final assembly, the cable extensions 32 and 34 would then be extended through both the flexible conduit 36 and the connector member 66, and the cable extensions 52 and 54 extended through the flexible conduit 60 and the sleeve 72. The cylindrical member 75, the seal 74, the washer 85 and the spring 84 are slid over the sleeve 72 in that order. The outer casing 69 of the splicing unit 38 is then mounted around the sleeve 72, such casing 69, along with the members 84, 85, 74 and 75, being free to slide along the flexible conduit 60, away from the free ends 106 and 108 of the cable extensions 52 and 54.

The free ends 86, 88, 106 and 108 of the cable extensions 54, 52, 34 and 32, respectively, are then connected by means of the brackets 94 and 96 and the button-like nuts or fasteners 98, 100, 114 and 116 in the following manner: Each end portion of cable extensions 32, 34, 52 and 54 is bowed around the convex side of the respective arcuate brackets 94 and 96, past the first of the two slots formed in the ends of each of the brackets and through the second of the two slots, where it is secured by the respective fastener 98, 100, 114 or 116. After two ends which extend in the same direction, are secured in this manner, the two ends extending in the other direction are then secured after the cables are drawn taut to set a desired initial preload in the system. The outer casing 69, the spring 84, washer 85, seal 74 and the cylindrical member 75 are next slid along the conduit 60 onto the sleeve 72, with the end 68 of the casing 69 being slid onto the connector member 66 with a light pressure fit, and abutted against the abutment 67 formed thereon. The assembled members of the splicing unit 38 are then retained in place by the mounting of the retaining ring 78 adjacent the outer face 81 of the cylindrical member 75 in a groove 80 formed in the sleeve 72. The brackets 94 and 96 and the fasteners 98, 100, 114 and 116 connecting the cable extensions 32, 34, 52 and 54 are thus housed within the casing 69 of the splicing unit 38.

It may be realized that the connector mechanism 38 just described serves to connect the two wire cables 26 and 46 with the result that they form, in effect, one endless, full-circle cable. In other words, any movement to the right in FIG. 3 of the bracket 94 and fasteners 98 and 116 will be compensated by a reciprocal movement of the other bracket 96 and fasteners 100 and 114 to the left within the splicing unit 38.

The spring 84 serves to maintain the initial preload that is set in the system at the final assembly, and thereafter to eliminate any slack in the system, such as could result from subsequent stretching of the cables 26 and 46, by urging the flexible conduit 60, via the washer 85, the seal 74, the ring 78 and the internal flange 73 of the sleeve 72, toward the anchor 62 (FIG. 2), and simultaneously urging the splicing unit 38 and its associated connector member 66, via the crimped-in abutment 82, to the left in FIG. 3. The internal collar 65 formed on the member 66 moves the flexible conduit 36 to the left to abut against the fixed anchor 44 (FIG. 2). The outlet ends 64 and 70 of the conduits 36 and 60, respectively, are thus spread apart to the extent permitted by the anchors 44 and 62 (FIG. 2) and the overall length of the continuous cable formed by the interconnected cable components 32, 34, 52 and 54.

Figure 5:
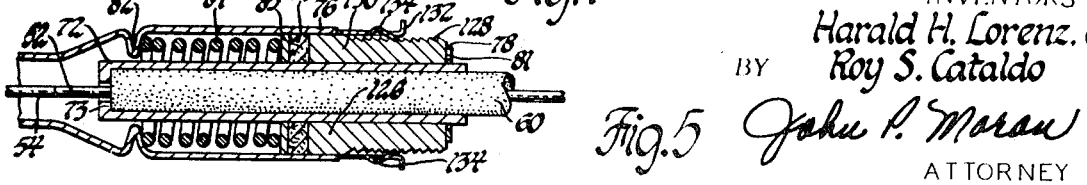
FIG. 5 is a cross-sectional view similar to FIG. 4 and including a modification of a portion thereof.

Referring now to FIG. 5, it may be noted that, in lieu of the cylindrical member 75 illustrated in FIGS. 3 and 4, a longer cylindrical member 126 may be used. Ratchet-like adjustment teeth 128 are formed on the outer surface of the member 126 on a portion 130 which extends outwardly from the splicing unit 38. Flat springs 132 are secured to the end 76 of the splicing unit 38, and each includes prongs 134 which mesh with the teeth 128 of the elongated member 126. In the event of any subsequent stretching of the cables 26 and 46, the spring 84 will expand between the washer 85 adjacent the seal 74 and the crimped portion 82 of the splicing unit 38, thereby effectively moving the conduits 60 and 36 apart. During this spreading action, the prongs 134 will ride over succeeding teeth 128 on the member 126 and be progressively forced by the spring member 132 into adjacent notches formed by the teeth 128. Such an arrangement serves to prevent the spring 84 from collapsing under operational load conditions, such as could occur when a vehicle is parked on a steep incline or hill with the parking lock engaged if the operational load encountered when shifting into drive, for example, is greater than the installed spring 84 load. Hence, any possibility of a spongy pedal reaction or feeling is eliminated.

It should be apparent that the invention provides an improved transmission control mechanism which precludes the necessity for close manufacturing tolerances between the sheath or conduit and the wire cable, while providing minimal frictional relationship therebetween.

It should be further apparent that the invention provides means for efficient utilization of either the usual mast jacket or an instrument panel-mounted lever or control knob to actuate the transmission through a pulley and continuous cable arrangement, and thereby eliminating the need for the usual shift tube and related linkage system.

It should also be apparent that this invention provides improved means for continually, automatically adjusting for any stretching of the cable which might occur during operation, after final assembly.

It should be still further apparent that the invention provides an improved shift control mechanism wherein a portion thereof may be preassembled on a steering column or instrument panel of the vehicle and another portion thereof may be preassembled on a shift control rod of an automatic transmission, with an intermediate connector device for readily connecting the first and second portions at final assembly and setting a desired initial preload therein.

It should also be apparent that the invention provides means for preventing a spongy feeling from being experienced should the operational load ever exceed the installed spring load.

While but two embodiments of the invention have been shown and described, other modifications thereof are possible.

We claim:

1. A control system comprising a controlling mechanism, a controlled mechanism, a first pulley operably responsive to manual actuation of said controlling mechanism, a second pulley operatively connected to said controlled mechanism, a first cable portion mounted on said first pulley for rotation therewith, a second cable portion mounted on said second pulley for rotation therewith, said first and second cable portions being slidably mounted in first and second flexible conduits, respectively, fixed abutment means for one end of each of said conduits, and an intermediate cable-connector device, said cable-connector device including a casing mounted on one of said flexible conduits for movement therewith and slidably mounted on the other of said flexible conduits, fastener means in said casing for connecting each pair of opposing ends of said first and second cable portions, and resilient means operatively connected to said other of said flexible conduits for urging said casing and said other of said flexible conduits apart to maintain said connected cable portions taut.

2. A control system comprsing a controlling mechanism; a controlled mechanism; a first pulley operably responsive to manual actuation of said controlling mechanism; a second pulley operatively connected to said controlled mechanism; a first cable mounted at an intermediate point thereof on said first pulley for rotation therewith; a second cable mounted at an intermediate point thereof on said second pulley for rotation therewith; a first flexible conduit; a second flexible conduit; a first fixed anchor intermediate said first pulley and one end of said first flexible conduit; a second fixed anchor intermediate said second pulley and one end of said second flexible conduit said first cable being slidably mounted through an opening in said first fixed anchor and through said first flexible conduit; said second cable being slidably mounted through an opening in said second fixed anchor and through said second flexible conduit; and a cable-connector device, said cable-connector device including fastener means for connecting each pair of opposing ends of said first and second cable, first abutment means for abutting against the other end of one of said first and second flexible conduits, second abutment means for abutting against the other end of the other of said first and second flexible conduits, resilient means having one end thereof abutting against a portion of one of said abutment means, a casing surrounding said fastener means, said one of said abutment means and said resilient means, said casing including means for abutting against the other end of said resilient means, said resilient means urging said first and second flexible conduits apart and against said respective first and second fixed anchors and maintaining said connected first and second cables taut.

3. For use with an automatic transmission, a shift control system comprising a shift-selector mechanism, a first pulley operably responsive to manual actuation of said shift-selector mechanism, a second pulley adapted to be operatively connected to the shift rod of said automatic transmission, a first cable portion mounted on said first pulley for rotation therewith, a second cable portion mounted on said second pulley for rotation therewith, said first and second cable portions being slidably mounted in first and second flexible conduits, respectively, fixed abutment means for one end of each of said conduits, and an intermediate cable-connector device, said cable-connector device including a casing mounted on one of said flexible conduits for movement therewith and slidably mounted on the other of said flexible conduits, fastener means in said casing for connecting each pair of opposing ends of said first and second cable portions, and resilient means operatively connected to said other of said flexible conduits for urging said casing and said other of said flexible conduits apart to maintain said connected cable portions taut.

4. The system described in claim 3, said resilient means including means operatively connected between said casing and said other of said flexible conduits for preventing said resilient means from collapsing under operational load conditions.

5. A shift control system comprising a shift-selector mechanism; a transmission shift rod; a first pulley operably responsive to manual actuation of said shift-selector mechanism; a second pulley operatively connected to said transmission shift rod; a first cable mounted at an intermediate point thereof on said first pulley for rotation therewith; a second cable mounted at an intermediate point thereof on said second pulley for rotation therewith; a first flexible conduit; a second flexible conduit; a first fixed anchor intermediate said first pulley and one end of said first flexible conduit; a second fixed anchor intermediate said second pulley and one end of said second flexible conduit; said first cable being slidably mounted through an opening in said first fixed anchor and through said first flexible conduit; said second cable being slidably mounted through an opening in said second fixed anchor and through said second flexible conduit; and a cable-connector device, said cable-connector device including a bracket and two fastener members for connecting each pair of opposing ends of said first and seond cables, first abutment means for abutting against the other end of one of said first and second flexible conduits, second abutment means for abutting against the other end of the other of said first and second flexible conduits, resilient means having one end thereof abutting against a portion of one of said abutment means, a tubular casing surrounding said fastener means, said one of said abutment means and said resilient means, said tubular casing including means for abutting against the other end of said resilient means, said resilient means urging said first and second flexible conduits apart and against said respective first and second fixed anchors and maintaining said connected first and second cables taut.

6. The system described in claim 5, and ratchet means disposed between said tubular casing and said one of said abutment means for preventing said tubular casing from returning toward a former position along said one of said abutment means under operational load conditions after relative separating movement therebetween in response to movement of said resilient means due to cable stretch.

7. The system described in claim 6, wherein said ratchet means includes at least one flat spring secured to one end of said casing, a plurality of teeth formed on said one of said abutment means, and a prong formed on said flat spring for meshing with one of said plurality of teeth.

8. For use with an automatic transmission, a shift control system comprising a shift-selector mechanism, a first pulley operably responsive to manual actuation of said shift-selector mechanism, a second pulley adapted to be operatively connected to the shift rod of said automatic transmission, a first length of cable connected at an intermediate point thereof to the outer periphery of said first pulley, a second length of cable connected at an intermediate point thereof to the outer periphery of said second pulley, said first and second cable lengths being slidably mounted in first and second flexible conduits, respectively, fixed abutment means for one end of each of said flexible conduits, an intermediate cable-connector device, said cable-connector device including a housing mounted for movement with said second flexible conduit and including means for being slidably mounted on said first flexible conduit, first fastener means in said housing for connecting one end of each said first and second cable lengths, second fastener means in said housing for connecting the other end of each of said first and second cable lengths, said connected first and second cable lengths serving as a continuous cable rotatable by said first pulley within the passage formed through said first and second flexible conduits and said housing, and resilient means for urging said housing and said first flexible conduit apart to compensate for cable stretch and maintain said cable taut.

9. For use with an automatic transmission, a shift control system comprising a shift-selector mechanism, a first pulley operably responsive to manual actuation of said shift-selector mechanism, a second pulley adapted to be operatively connected to the shift rod of said automatic transmission, a first cable portion secured to said first pulley, a second cable portion secured to said second pulley, said first and second cable portions being slidably mounted in first and second flexible conduits, respectively, an intermediate cable-connector device, said cable-connector device including a housing mounted for movement with said second flexible conduit and slidably mounted on said first flexible conduit, a first bracket in said housing, a first pair of fasteners for connecting one end of each of said first and second cable portions on said first bracket, a second bracket in said housing, a second pair of fasteners for connecting the other end of each of said first and second cable portions on said second bracket, said connected cable portions serving as a continuous cable rotatable by said shift-selector mechanism within the passage formed through said first and second flexible conduits and said housing to establish a predetermined speed ratio within said automatic transmission, and resilient means for urging said housing and said first flexible conduit apart to compensate for cable stretch and maintain said cable taut.

10. A shift control system comprising a shift-selector mechanism; a transmission shift rod; a first pulley operably responsive to manual actuation of said shift-selector mechanism; a second pulley operatively connected to said transmission shift rod; a first cable mounted at an intermediate point thereof on said first pulley for rotation therewith; a second cable mounted at an intermediate point thereof on said second pulley for rotation therewith; a first flexible conduit; a second flexible conduit; a first fixed anchor intermediate said first pulley and one end of said first flexible conduit; a second fixed anchor intermediate said second pulley and one end of said second flexible conduit; said first cable being slidably mounted through an opening in said first fixed anchor and through said first flexible conduit; said second cable being slidably mounted through an opening in said second fixed anchor and through said second flexible conduit; and a cable-connector device, said cable-connector device including first and second arcuate-shaped brackets, each of said brackets having both end portions thereof bent away from the concave side thereof, a slot formed in each bent end portion, two fastener members for connecting each pair of opposing ends of said first and second cables to said bent end portions after said cables are extended through said slots, a first flanged sleeve means for abutting against the other end of one of said first and second flexible conduits, second flanged sleeve means for abutting against the other end of the other of said first and second flexible conduits, spring means having one end thereof abutting against a portion of one of said flanged sleeve means, a tubular casing surrounding said fastener members, said one of said flanged sleeve means and said spring means, said tubular casing being shaped to uniformly clear the outer edges of said brackets and said fastener members and to slidably fit on said one of said flanged sleeve means and to fit on the other of said flanged sleeve means with a slight press fit and including an intermediate crimped portion for abutting against the other end of said spring means, said spring means urging said first and second flexible conduits apart and against said respective first and second fixed anchors and maintaining said connected first and second cables taut.

11. The system described in claim 10, said spring means including ratchet means disposed between said tubular casing and said one of said flanged sleeve means for preventing said tubular casing from returning toward a former position along said one of said flanged sleeve means under operational load conditions after relative separating movement therebetween in response to movement of said spring means due to cable stretch.

12. The system described in claim 11, wherein said ratchet means includes at least one flat spring secured to one end of said casing, a plurality of teeth formed on said one of said flanged sleeve means, and a prong formed on said flat spring for meshing with one of said plurality of teeth.

13. A method of interconnecting a shift-selector mechanism and an automatic transmission, said method comprising the following steps:
 (a) mounting a first pulley so as to actuate shift control rod of said automatic transmission;
 (b) mounting a second pulley so as to be actuated by said shift-selector mechanism;
 (c) mounting a third pulley aligned with and adjacent said first pulley;
 (d) mounting a fourth pulley aligned with and adjacent said second pulley;
 (e) securing a first flexible cable at an intermediate point thereof to the outer periphery of said first pulley and over the outer periphery of said third pulley;
 (f) securing a second flexible cable at an intermediate point thereof to the outer periphery of said second pulley and over the outer periphery of said fourth pulley;
 (g) mounting a first flexible conduit on said first flexible cable, with one end thereof abutting against a first fixed anchor;
 (h) mounting a second flexible conduit on said second flexible cable with one end thereof abutting against a second fixed anchor;
 (i) mounting a first flanged sleeve member on the other end of one of said first and second flexible cables;
 (j) mounting a second flanged sleeve member on the other end of the other of said first and second flexible cables;
 (k) sliding a cylindrical member, a seal, a washer and a spring in that order over one of said first and second flanged sleeve members;
 (l) sliding a tubular casing having an intermediate crimped portion formed thereon over said one of said first and second flanged sleeve members;
 (m) securing each free end of said first flexible cable to the furthermost end of an arcuate bracket;

(n) securing each free end of said second flexible cable to the other end of each of said arcuate brackets to complete the splicing of said first and second flexible cables;
(o) sliding said tubular casing into contact at one end thereof with the other of said first and second flanged sleeve members;
(p) sliding said spring, said washer, said seal and said cylindrical member into the other end of said tubular casing against said crimped portion; and
(q) compressing said spring to set a predetermined preload in the system and placing a retainer means on said one of said first and second flanged sleeve members to retain said spring in said compressed state.

References Cited
UNITED STATES PATENTS

| | | | |
|---|---|---|---|
| 3,036,350 | 5/1962 | Hunt | 74—501.5 |
| 3,307,421 | 3/1967 | Gilmore | 74—501 |

MILTON KAUFMAN, Primary Examiner

U.S. Cl. X.R.

74—473SW